(12) United States Patent  (10) Patent No.: US 9,262,003 B2
Kitchens et al.  (45) Date of Patent: Feb. 16, 2016

(54) PIEZOELECTRIC FORCE SENSING ARRAY

(71) Applicant: QUALCOMM Incorporated, San Diego, CA (US)

(72) Inventors: Jack C. Kitchens, Tonawanda, NY (US); John K. Schneider, Amherst, NY (US); Stephen M. Gojevic, Lockport, NY (US)

(73) Assignee: Qualcomm Incorporated, San Diego, CA (US)

( * ) Notice: Subject to any disclaimer, the term of this patent is extended or adjusted under 35 U.S.C. 154(b) by 199 days.

(21) Appl. No.: 14/071,320

(22) Filed: Nov. 4, 2013

(65) Prior Publication Data

US 2015/0123931 A1  May 7, 2015

(51) Int. Cl.
*G06F 3/041* (2006.01)
*G06K 9/00* (2006.01)
*G06F 3/043* (2006.01)

(52) U.S. Cl.
CPC ............ *G06F 3/0414* (2013.01); *G06F 3/0436* (2013.01); *G06K 9/0002* (2013.01); *G06F 2203/04105* (2013.01); *G06F 2203/04106* (2013.01)

(58) Field of Classification Search
CPC ............ G06F 3/041; G06F 3/043; G06K 9/00
See application file for complete search history.

(56) References Cited

U.S. PATENT DOCUMENTS

| 4,644,406 | A | 2/1987 | Nishigaki et al. |
| 5,003,167 | A | 3/1991 | Arques |
| 5,243,332 | A | 9/1993 | Jacobson |
| 7,166,966 | B2 | 1/2007 | Naugler et al. |
| 7,197,168 | B2 | 3/2007 | Russo |
| 7,211,818 | B2 | 5/2007 | Imai et al |
| 7,239,728 | B1 | 7/2007 | Choi et al. |
| 7,330,571 | B2 | 2/2008 | Svensson et al. |
| 7,541,605 | B2 | 6/2009 | Takahashi |
| 7,574,022 | B2 | 8/2009 | Russo |

(Continued)

FOREIGN PATENT DOCUMENTS

| EP | 0593386 A2 | 4/1994 |
| GB | 2150785 A | 7/1985 |

(Continued)

OTHER PUBLICATIONS

International Search Report and Written Opinion—PCT/US2014/054057—ISA/EPO—Nov. 10, 2014.

(Continued)

*Primary Examiner* — Premal Patel
(74) *Attorney, Agent, or Firm* — Weaver Austin Villeneuve & Sampson, LLP

(57) ABSTRACT

A touch sensing system may include a pressure and force sensing device capable of sensing dynamic pressure or dynamic force applied to a piezoelectric sensing array. In such implementations, an applied force may be detected (and optionally recorded) during a period of time that the force is applied and changing. The force-sensing device may have a sufficiently high resolution to function as a fingerprint sensor. The touch sensing system may include one or more additional components capable of fingerprint sensing, such as an ultrasonic transmitter that allows the device to become an ultrasonic transducer capable of imaging a finger (or another object) in detail. The force-sensing device also may be capable of functioning as an ultrasonic receiver.

18 Claims, 10 Drawing Sheets

(56) References Cited

U.S. PATENT DOCUMENTS

| | | | |
|---|---|---|---|
| 7,785,912 | B2 | 8/2010 | Zhan et al. |
| 8,139,041 | B2 | 3/2012 | Na |
| 8,139,827 | B2 | 3/2012 | Schneider et al. |
| 8,144,115 | B2 | 3/2012 | Konicek |
| 8,201,739 | B2 | 6/2012 | Schneider et al. |
| 8,233,672 | B2 | 7/2012 | Matos |
| 8,416,227 | B2 | 4/2013 | Fujioka et al. |
| 8,508,340 | B2 | 8/2013 | Sanchez Sanchez et al. |
| 8,661,254 | B1 | 2/2014 | Sama |
| 2002/0174346 | A1 | 11/2002 | Ting |
| 2003/0174870 | A1 | 9/2003 | Kim et al. |
| 2004/0239648 | A1 | 12/2004 | Abdallah et al. |
| 2005/0219222 | A1 | 10/2005 | Johnson et al. |
| 2008/0037372 | A1 | 2/2008 | Schneider et al. |
| 2008/0136587 | A1 | 6/2008 | Orr |
| 2008/0175450 | A1 | 7/2008 | Scott |
| 2008/0253766 | A1 | 10/2008 | Yu et al. |
| 2008/0283751 | A1 | 11/2008 | Kymissis |
| 2009/0006991 | A1 | 1/2009 | Lindberg et al. |
| 2009/0235750 | A1 | 9/2009 | Chang et al. |
| 2010/0053118 | A1 | 3/2010 | Chen |
| 2010/0066686 | A1 | 3/2010 | Joguet et al. |
| 2010/0237992 | A1 | 9/2010 | Liautaud |
| 2011/0215150 | A1* | 9/2011 | Schneider et al. ............ 235/439 |
| 2011/0279662 | A1 | 11/2011 | Schneider et al. |
| 2011/0298711 | A1 | 12/2011 | Dean et al. |
| 2012/0014569 | A1 | 1/2012 | Frye et al. |
| 2012/0144306 | A1 | 6/2012 | Moody et al. |
| 2012/0147698 | A1 | 6/2012 | Wong et al. |
| 2012/0191568 | A1 | 7/2012 | Gandhi |
| 2012/0311165 | A1 | 12/2012 | Renschler et al. |
| 2013/0036017 | A1 | 2/2013 | Galloway |
| 2013/0049771 | A1 | 2/2013 | Peng et al. |
| 2013/0120284 | A1 | 5/2013 | Chen et al. |
| 2013/0127592 | A1 | 5/2013 | Fyke et al. |
| 2013/0132906 | A1 | 5/2013 | Siurumaa et al. |
| 2013/0135247 | A1 | 5/2013 | Na et al. |
| 2013/0136321 | A1* | 5/2013 | Lee et al. ............ 382/124 |
| 2013/0160109 | A1 | 6/2013 | Klinghult |
| 2013/0201134 | A1 | 8/2013 | Schneider et al. |
| 2013/0272586 | A1 | 10/2013 | Russo |
| 2013/0279768 | A1 | 10/2013 | Boshra |
| 2013/0279769 | A1 | 10/2013 | Benkley, III et al. |
| 2013/0335371 | A1 | 12/2013 | Bayramoglu et al. |
| 2014/0003678 | A1 | 1/2014 | Vieta et al. |
| 2014/0198960 | A1 | 7/2014 | Thompson et al. |
| 2014/0333328 | A1 | 11/2014 | Nelson et al. |
| 2014/0354596 | A1 | 12/2014 | Djordjev et al. |
| 2014/0359757 | A1 | 12/2014 | Sezan et al. |
| 2015/0070320 | A1 | 3/2015 | Hong et al. |
| 2015/0070323 | A1 | 3/2015 | Hong et al. |
| 2015/0071648 | A1 | 3/2015 | Hong et al. |
| 2015/0084873 | A1* | 3/2015 | Hagenbuch et al. ......... 345/173 |

FOREIGN PATENT DOCUMENTS

| | | |
|---|---|---|
| JP | 56002075 | 1/1981 |
| JP | 59041957 | 3/1984 |
| KR | 20130066152 A | 6/2013 |
| TW | M452385 U1 | 5/2013 |
| WO | 9928701 | 6/1999 |
| WO | 2005043451 | 5/2005 |
| WO | 2006042144 A2 | 4/2006 |
| WO | 2007146785 A2 | 12/2007 |
| WO | 2009032522 A1 | 3/2009 |
| WO | 2009139760 A1 | 11/2009 |
| WO | 2014197333 A1 | 12/2014 |
| WO | 2015038396 | 3/2015 |
| WO | PCT/US15/19498 | 3/2015 |
| WO | PCT/US15/19499 | 3/2015 |
| WO | 2015066330 A1 | 5/2015 |
| WO | 2015066599 A2 | 5/2015 |
| WO | 2015153067 A1 | 10/2015 |
| WO | 2015153068 A1 | 10/2015 |

OTHER PUBLICATIONS

International Search Report and Written Opinion—PCT/US2014/040380—ISA/EPO—Oct. 6, 2014.
Invitation to Pay Additional Fees and, Where Applicable, Protest Fee—PCT/US2014/063663—ISA/EPO—Jan. 27, 2015.
International Search Report and Written Opinion—PCT/US2014/063158—ISA/EPO—Feb. 2, 2015.
Feng T., et al., (2012) "Continuous Remote Mobile Identity Management Using Biometric Integrated Touch-Display," 45th Annual IEEE/ACM International Symposium on Microarchitecture Workshops (MICROW), pp. 55-62.
U.S. Restriction Requirement dated May 28, 2015, issued in U.S. Appl. No. 14/088,021.
U.S. Office Action dated Jun. 18, 2015, issued in U.S. Appl. No. 14/071,362.
U.S. Office Action dated May 18, 2015, issued in U.S. Appl. No. 14/178,156.
U.S. Final Office Action dated Sep. 2, 2015, issued in U.S. Appl. No. 14/178,156.
Second Written Opinion of the International Preliminary Examining Authority dated May 7, 2015, issued in PCT/US2014/040380.
International Preliminary Report on Patentability—PCT/US2014/040380—ISA/EPO—Sep. 11, 2015.
International Search Report and Written Opinion—PCT/US2014/063663—ISA/EPO—May 27, 2015.
Second Written Opinion of the International Preliminary Examining Authority dated Oct. 5, 2015, issued in PCT/US2014/063663.
Second Written Opinion of the International Preliminary Examining Authority dated Sep. 30, 2015, issued in PCT/US2014/063158.
International Search Report and Written Opinion—PCT/US2015/019498—ISA/EPO—Jun. 10, 2015.
Invitation to Pay Additional Fees and, Where Applicable, Protest Fee—PCT/US2015/019499—ISA/EPO—Jun. 8, 2015.
International Search Report and Written Opinion—PCT/US2015/019499—ISA/EPO—Aug. 31, 2015.
Sattler, Klaus D. (2014) "Fundamentals of Picoscience," *CRC Press, Taylor & Francis Group*, New York, pp. 541-592.
Ihara, Ikuo (2008) "Ultrasonic Sensing: Fundamentals and Its Applications to Nondestructive Evaluation (a draft)," *Nagaoka University of Technology*, pp. 1-20.
U.S. Notice of Allowance dated Dec. 8, 2015, issued in U.S. Appl. No. 14/071,362.

* cited by examiner

PIEZOELECTRIC FORCE SENSING ARRAY

TECHNICAL FIELD

This disclosure relates generally to touch sensing systems.

DESCRIPTION OF THE RELATED TECHNOLOGY

The basic function of a touch sensing system is to convert the detected presence of one or more fingers, pens or other objects near or on a touch panel into position information. Such position information can be used as input for further action on a mobile phone, a computer, or another such device.

Various types of touch sensing systems are currently in use. Some are based on detected changes in resistivity or capacitance, on acoustical surface acoustic wave responses, interruption of an infrared light beam, etc. At present, the most widely used touch sensing techniques are projected capacitance methods, wherein the presence of an electrically conductive body (such as a finger, an electrically conductive stylus, etc.) is sensed as a change in the local capacitance between a pair of electrodes. In some implementations, the pair of electrodes may be part of a display device. For example, the electrodes may be on the inside surface of a substantially transparent cover substrate (a "cover glass") or a substantially transparent display substrate (a "display glass").

It would be desirable to have a touch sensing system with higher sensitivity, robustness and/or better energy efficiency than those of previously-disclosed touch sensing systems, and one that does not require a touch from an electrically conductive object.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus which includes a touch sensing system. The touch sensing system may include a force-sensing device. The force-sensing device may include a substrate, an array of sensor pixel circuits disposed on the substrate and discrete elements of a piezoelectric film layer. Each discrete element of the piezoelectric film layer may correspond with an individual sensor pixel circuit.

The force-sensing device may include a plurality of pixel input electrodes. Each pixel input electrode may be configured for making an electrical connection between a first side of a discrete element of the piezoelectric layer and one of the sensor pixel circuits. The force-sensing device may include a receiver bias electrode configured for making an electrical connection with a second side of discrete elements of the piezoelectric layer In some implementations, the force-sensing device may include a control system capable of receiving a signal from one or more of the sensor pixel circuits and capable of determining a location of an object exerting the force. The signal may correspond to a force applied to one or more discrete elements of the piezoelectric film layer. In some implementations, the force-sensing device may have a sufficiently high resolution to function as a fingerprint sensor.

In some implementations, each sensor pixel circuit may include a charge amplifier capable of amplifying charges received from the pixel input electrode. According to some such implementations, each sensor pixel circuit also may include a peak detection circuit capable of registering a maximum amount of charge produced by the applied force. Each sensor pixel circuit also may include a reset device capable of removing accumulated charge from the peak detection circuit.

The touch sensing system also may include an ultrasonic transmitter. In some such implementations, the control system may be capable of operating the touch sensing system in an ultrasonic imaging mode or a force-sensing mode. The control system may, in some examples, be capable of maintaining the ultrasonic transmitter in an "off" state when operating the touch sensing system in a force-sensing mode.

The touch sensing system may include a memory system. The control system may be capable of capturing a fingerprint image and storing fingerprint image data in the memory system while maintaining the ultrasonic transmitter in the "off" state.

In some implementations, the control system may be capable of controlling access to one or more devices based, at least in part, on fingerprint data corresponding to the fingerprint image data. Such fingerprint data may include data corresponding to the types, locations and/or spacing of fingerprint minutiae.

In some examples, the force-sensing device may be capable of functioning as an ultrasonic receiver when the touch sensing system is operating in the ultrasonic imaging mode. In some implementations, the control system may be capable of detecting a touch or tap received via the force-sensing device and switching on the ultrasonic transmitter in response to the touch or tap.

The substrate may, in some implementations, be a thin film transistor (TFT) substrate. The sensor pixel circuits may include TFT sensor pixel circuits.

In some implementations, a mobile display device may include the touch sensing system. The control system may be capable of detecting a touch or tap received via the force-sensing device and of activating at least one feature of the mobile display device in response to the touch or tap. For example, the control system may be capable of operating the mobile display device in a sleep mode during periods of inactivity, of detecting a touch or tap received via the force-sensing device and of waking the mobile display device from the sleep mode in response to the touch or tap.

Other innovative aspects of the subject matter described in this disclosure can be implemented in a method that may involve receiving, from a force-sensing device of a touch sensing system, an indication of a user touch or tap. The method may involve operating the touch sensing system in an ultrasonic imaging mode based, at least in part, on the touch or tap.

In some implementations, the receiving process may involve receiving the indication from an ultrasonic receiver while an ultrasonic transmitter is switched off. The operating process may involve switching on the ultrasonic transmitter.

Other innovative aspects of the subject matter described in this disclosure can be implemented in a touch sensing system that includes an ultrasonic receiver. The ultrasonic receiver may include a piezoelectric film layer and an array of sensor pixel circuits. The touch sensing system may include an ultrasonic transmitter and a control system. The control system may be capable of receiving, while the ultrasonic transmitter is switched off, a signal from one or more of the sensor pixel circuits of the ultrasonic receiver. The signal may correspond to a force applied to the piezoelectric film layer. The control system may be capable of switching on the ultrasonic transmitter means in response to the signal. The control system may be capable of determining a position or a motion of one or more objects may correspond to a plurality of signals received by the receiving means.

In some implementations, a mobile display device may include the touch sensing system. In some such implementations, the control system may be capable of operating the mobile display device in a sleep mode during periods of inactivity and may be capable of waking the mobile display device from the sleep mode in response to the signal. Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
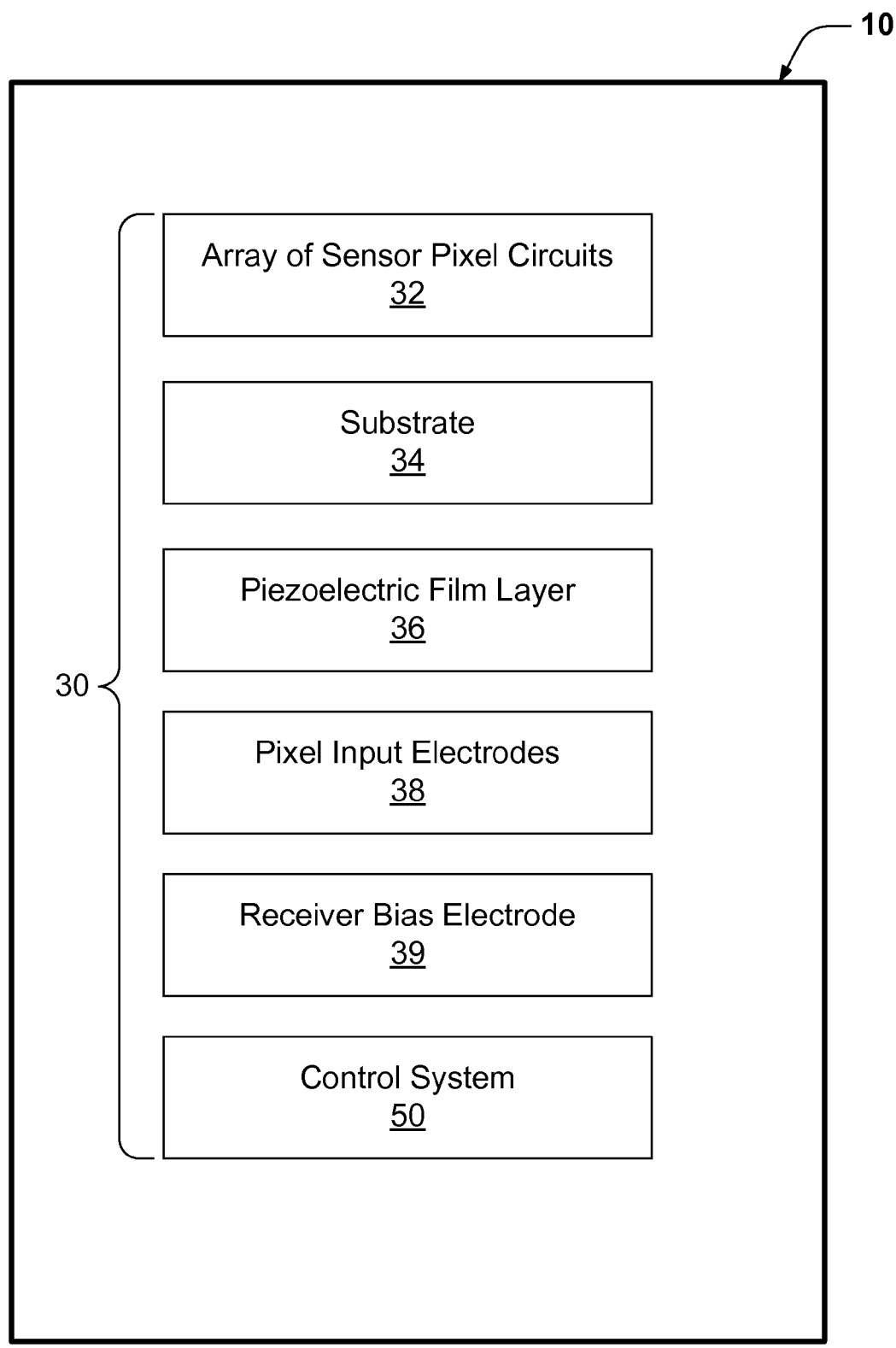
FIG. 1A is a block diagram of one example of a touch sensing system.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a touch sensing system. In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various implementations described herein relate to touch sensing systems that include a pressure and force sensing device capable of sensing dynamic pressure or dynamic force. For the sake of simplicity, such a pressure and force sensing device may be referred to herein simply as a "force-sensing device." Similarly, an applied pressure and force may be referred to herein simply as an "applied force" or the like, with the understanding that applying force with a physical object will also involve applying pressure. In some implementations, the touch sensing system may include a piezoelectric sensing array. In such implementations, an applied force may be detected (and optionally recorded) during a period of time that the force is applied and changing. In some implementations, the force-sensing device may have a sufficiently high resolution to function as a fingerprint sensor. As used herein, the term "finger" refers to a finger or a thumb. Accordingly, a "fingerprint" may be a fingerprint or a thumbprint.

In some implementations, the touch sensing system may include one or more additional components capable of fingerprint sensing, such as an ultrasonic transmitter that allows the device to become an ultrasonic transducer capable of imaging a finger in detail. In some such implementations, the force-sensing device also may be capable of functioning as an ultrasonic receiver.

Particular implementations of the subject matter described in this disclosure may be implemented to realize one or more of the following potential advantages. Some implementations may require little or no power to be provided to the force-sensing device for some functionality, because power may be supplied by converting the mechanical energy of a user's touch into electrical energy via piezoelectric material. Some touch sensing systems that include an ultrasonic transmitter also may include a control system that is capable of receiving user input from the force-sensing device and turning the ultrasonic transmitter on or off according to the user input. In some implementations, the force-sensing device may detect an initial tap or pressure from a finger or other object in a passive sense mode, and then turn on the ultrasonic transmitter for higher resolution ultrasonic imaging, wake up another device, or initiate another function. Such implementations may allow relatively more energy-consumptive devices to be switched off when not in use, thereby saving energy. In some implementations, a control system may be capable of waking up one or more features (which may be hardware elements, software applications, etc.) of a mobile display device from a sleep mode according to input from the force-sensing device. Such implementations also may result in energy savings.

Some implementations may provide the ability to detect a touch from (and/or to detect the proximity of) any object, whether the object is electrically conductive or not. Some implementations may be capable of measuring the amount of force that a user is applying to a force-sensing device. In some implementations, an image of a contact object (for example, a finger) corresponding to localized force measurements may be available quickly, e.g., as a fingerprint image. Fingerprint data corresponding to the fingerprint image may be used as part of an authentication process, such as an authentication process for controlling access to one or more devices.

Figure 1B:
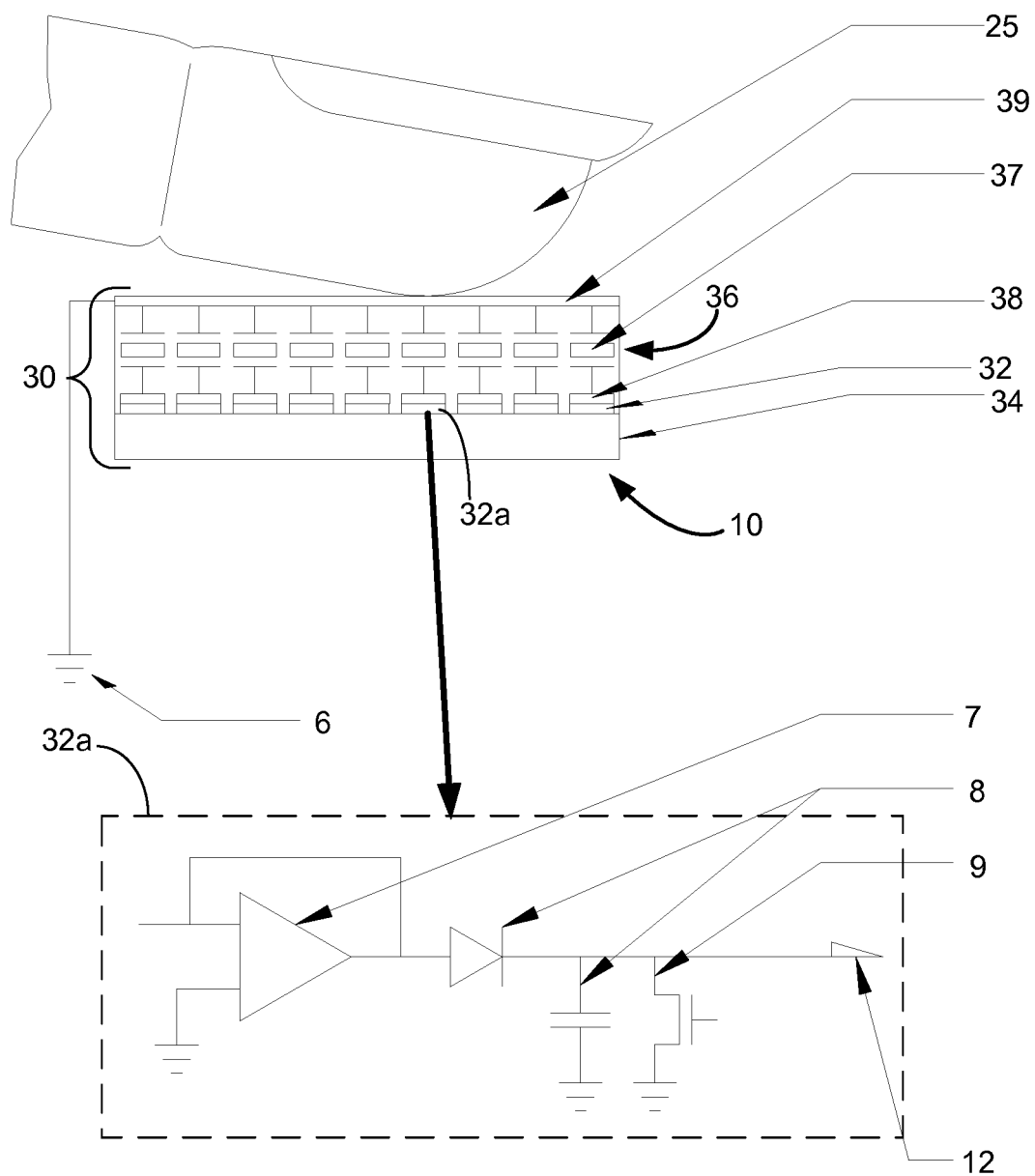
FIGS. 1B and 1C are schematic representations of examples of the touch sensing system shown in FIG. 1A, with additional details shown of a single sensor pixel.
Figure 1C:
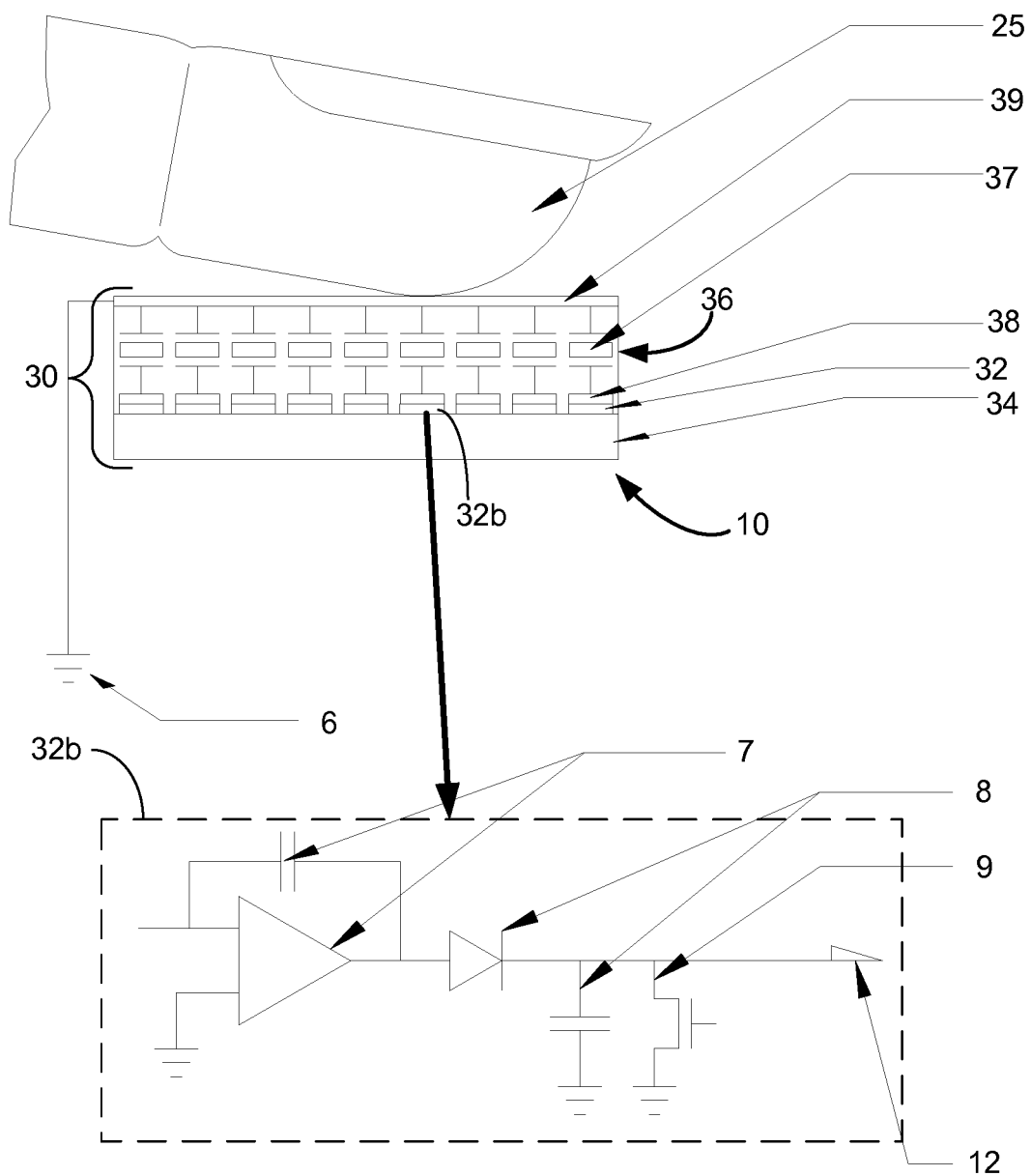

FIG. 1A is a block diagram of one example of a touch sensing system. FIGS. 1B and 1C are schematic representations of examples of the touch sensing system shown in FIG. 1A, with additional details shown of a single sensor pixel. Referring first to FIG. 1A, in this example the touch sensing system 10 includes a force-sensing device 30 having an array of sensor pixels 32 disposed on a substrate 34, the array of sensor pixels 32 being capable of receiving charges from a piezoelectric film layer 36 via pixel input electrodes 38. In this example, the piezoelectric film layer 36 is also configured for electrical contact with a receiver bias electrode 39. A control system 50 is capable of controlling the force-sensing device 30, e.g., as described below.

In the example shown in FIG. 1B, the substrate 34 is a thin film transistor (TFT) substrate. The array of sensor pixels 32 is disposed on the TFT substrate. Here, each of the sensor pixels 32 has a corresponding pixel input electrode 38, which configured for electrical connection with a discrete element 37 of the piezoelectric film layer 36. The receiver bias electrode 39, which is connected to an externally applied receiver bias voltage 6 in this example, is disposed on an opposite side of the piezoelectric film layer 36 with respect to the pixel input electrodes 32. In this example, the applied receiver bias voltage 6 is a ground. Some implementations may include a continuous receiver bias electrode 39 for each row or column of sensor pixels 32. Alternative implementations may include a continuous receiver bias electrode 39 above all of the sensor pixels 32 in the sensor pixel array.

Force applied by the object 25, which is a finger in this example, may squeeze or otherwise deform at least some of the discrete elements 37 of the piezoelectric layer 36. The receiver bias electrode 39 and the pixel input electrodes 38 allow the array of sensor pixels 32 to measure the electrical charge generated on the surfaces of the discrete elements 37 of the piezoelectric layer 36 that result from the deformation of the discrete elements 37.

FIG. 1B shows an enlarged view of one example of a single sensor pixel 32a. In this example, the charge produced at each of the pixel input electrodes of each sensor pixel is input to a charge amplifier 7. Amplified charges from the charge amplifier 7 are provided to a peak detection circuit 8 in this example. The peak detection circuit 8 may be capable of registering a maximum amount of charge produced by the force applied to the piezoelectric layer 36, as amplified by the charge amplifier 7. An output signal 12 from the peak detection circuit 8 may be read out at a corresponding output connection. In this implementation, the reset device 9 is capable of discharging the storage capacitor of the peak detection circuit 8, so that the force-sensing device 30 may detect subsequent force or pressure instances. In this example, the charge is held until a corresponding signal is provided to a control system, such as the control system 50 shown in FIG. 1A. Each row or column of sensor pixels 32 may be scanned via a row select mechanism, a gate driver, a shift register, etc. Some examples are described below.

The control system 50 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 50 also may include (and/or be configured for communication with) one or more memory devices, such as one or more random access memory (RAM) devices, read-only memory (ROM) devices, etc. The control system 50 may be capable of determining a location in which the object 25 is exerting a force on the force-sensing device 30 according to signals provided by multiple sensor pixels 32. In some implementations, the control system 50 may be capable of determining locations and/or movements of multiple objects 25. According to some such implementations, the control system 50 may be capable of controlling a device according to one or more determined locations and/or movements. For example, in some implementations, the control system 50 may be capable of controlling a mobile display device, such as the display device 740 shown in FIGS. 7A and 7B, according to one or more determined locations and/or movements.

According to some implementations, the force-sensing device 30 may have a sufficiently high resolution for the touch sensing system 10 to function as a fingerprint sensor. In some implementations, some of which are described below, the touch sensing system 10 may include an ultrasonic transmitter and the force-sensing device 30 may be capable of functioning as an ultrasonic receiver. The control system 50 may be capable of controlling the ultrasonic transmitter and/or the force-sensing device 30 to obtain fingerprint image data, e.g., by capturing fingerprint images. Whether or not the touch sensing system 10 includes an ultrasonic transmitter, the control system 50 may be capable of controlling access to one or more devices based, at least in part, on the fingerprint image data.

In some implementations, the control system 50 may be capable of operating the touch sensing system in an ultrasonic imaging mode or a force-sensing mode. In some implementations, the control system may be capable of maintaining the ultrasonic transmitter in an "off" state when operating the touch sensing system in a force-sensing mode.

Figure 5:
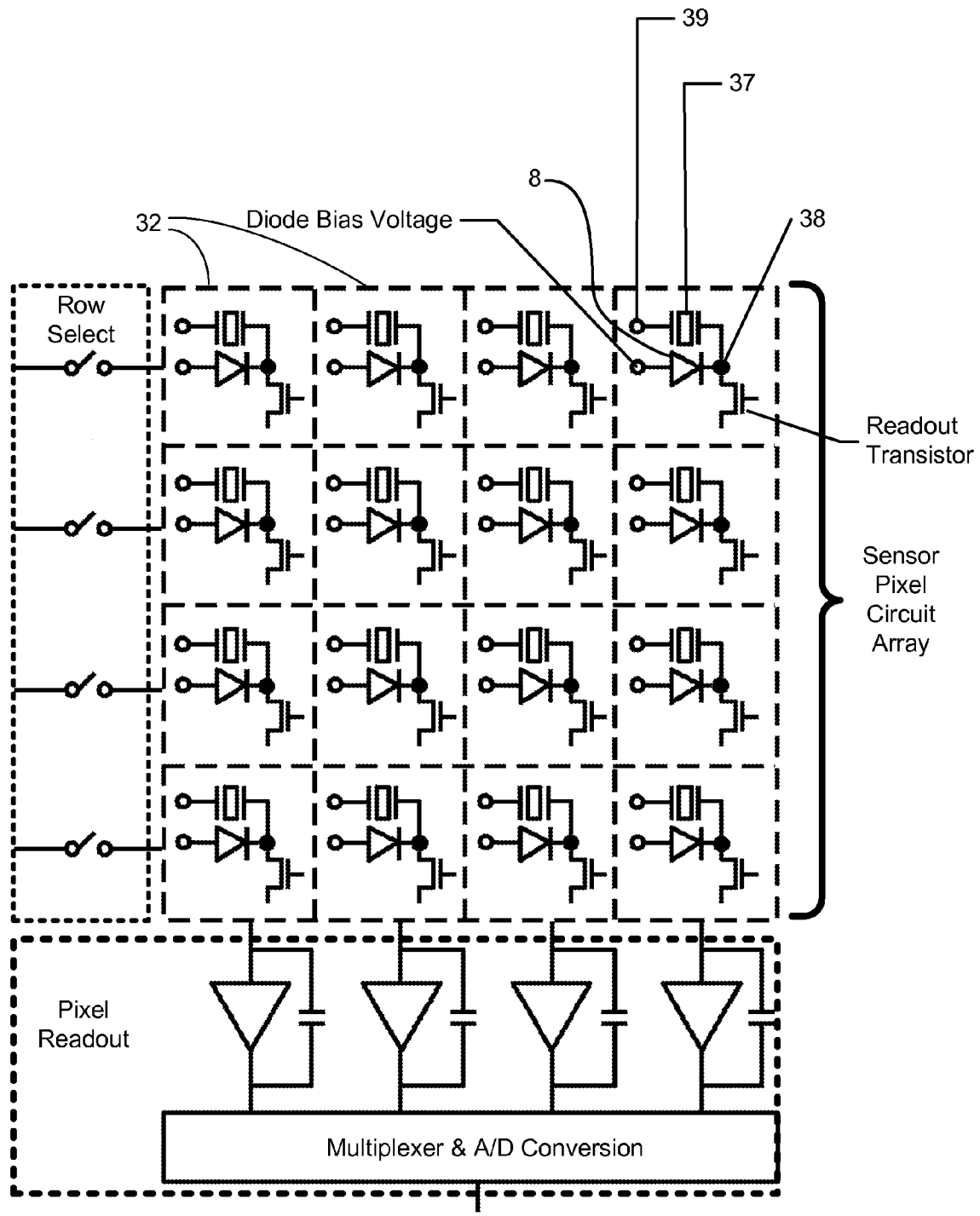
FIG. 5 depicts a 4×4 pixel array of sensor pixel circuits for a touch sensing system.
Figure 6:
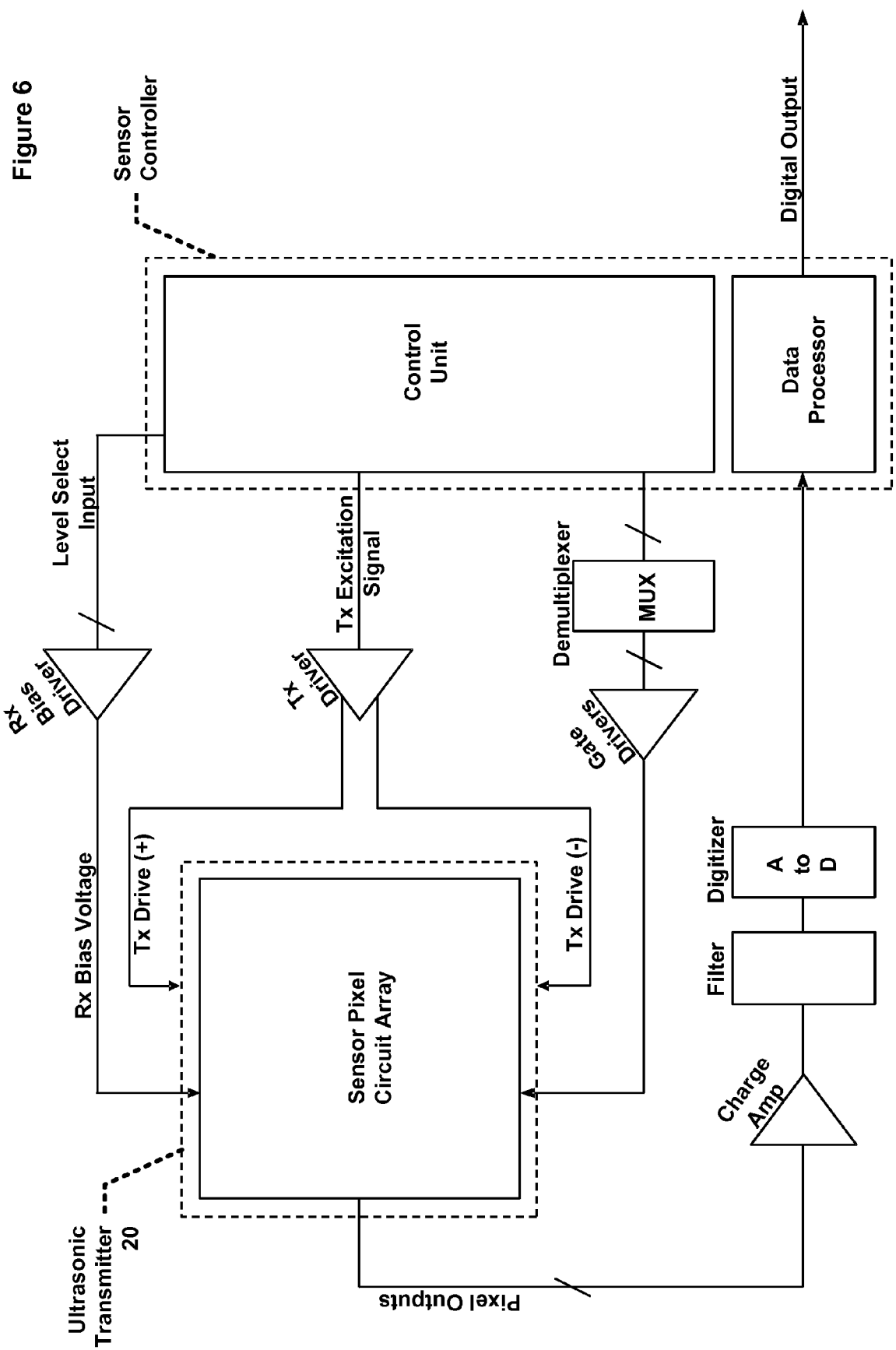
FIG. 6 shows an example of a high-level block diagram of a touch sensing system.

In this example, the reset device 9 is capable of resetting the peak detection circuit 8 after reading the charge, making the peak detection circuit 8 ready for reading subsequent charges from the charge amplifier 7. In some implementations, addressing and/or resetting functionality may be provided by TFTs of the TFT array 1. A readout transistor for each row or column may be triggered to allow the magnitude of the peak charge for each pixel to be read by additional circuitry not shown in FIG. 1, e.g., a multiplexer and/or an A/D converter. Some examples are shown in FIGS. 5 and 6, and are described below.

The elements of the force-sensing device 30 shown in FIGS. 1A and 1B are merely examples. An alternative implementation of a force-sensing device 30 is shown in FIG. 1C.

In this example, the charge amplifier 7 is an integrating charge amplifier, which includes a diode and a capacitor. In this implementation, the array of sensor pixels 32 is capable of measuring the charge developed across the piezoelectric layer 36 that results from the discrete elements 37 corresponding to each affected sensor pixel 32 being tapped, squeezed, or otherwise deformed. Here, the charge of each affected sensor pixel 32 is input to the integrating charge amplifier. The charges from the integrating charge amplifier may be processed substantially as described above.

In some implementations, the touch sensing system 10 may include one or more additional components, such as an ultrasonic transmitter that allows the touch sensing system 10 to function as an ultrasonic transducer capable of imaging a finger in detail. In some such implementations, the force-sensing device 30 may be capable of functioning as an ultrasonic receiver.

Figure 2:
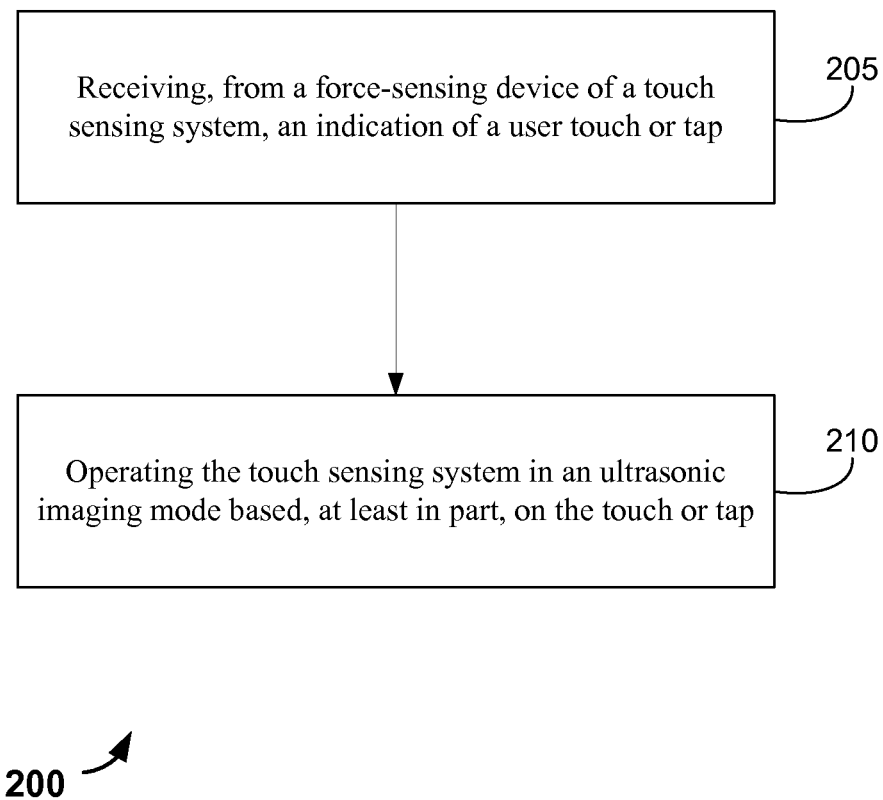
FIG. 2 is a flow diagram that outlines an example of a process of receiving user input from a force-sensing device and turning an ultrasonic transmitter on or off according to the user input.

FIG. 2 is a flow diagram that outlines an example of a process of receiving user input from a force-sensing device and turning an ultrasonic transmitter on or off according to the user input. In this example, method 200 begins with block 205, which involves receiving an indication of a user touch or tap from a force-sensing device 30 of a touch sensing system 10. Block 210 involves operating the touch sensing system 10 in an ultrasonic imaging mode based, at least in part, on the touch or tap.

Figure 3A:
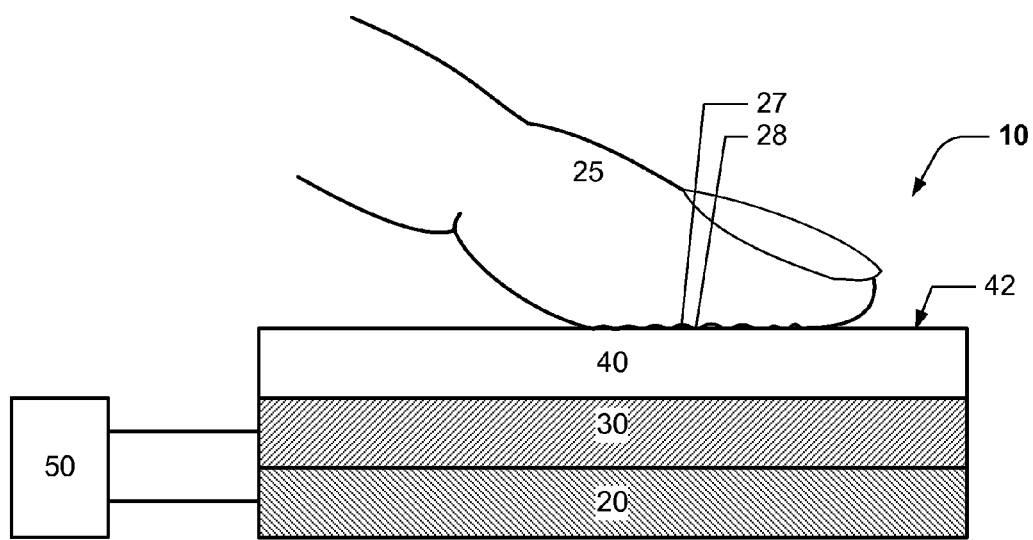
FIGS. 3A-3C provide examples of the process outlined in FIG. 2.
Figure 3B:
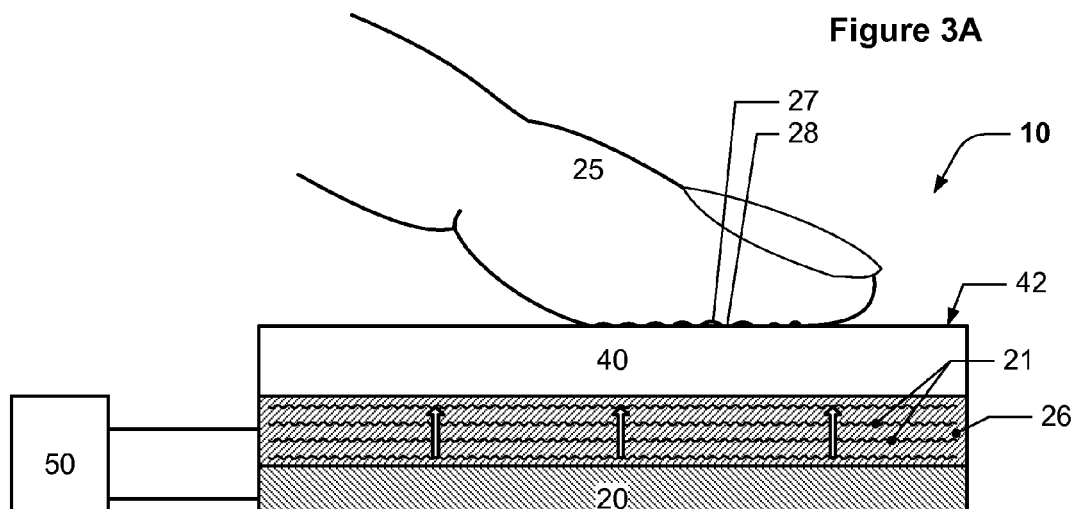
Figure 3C:
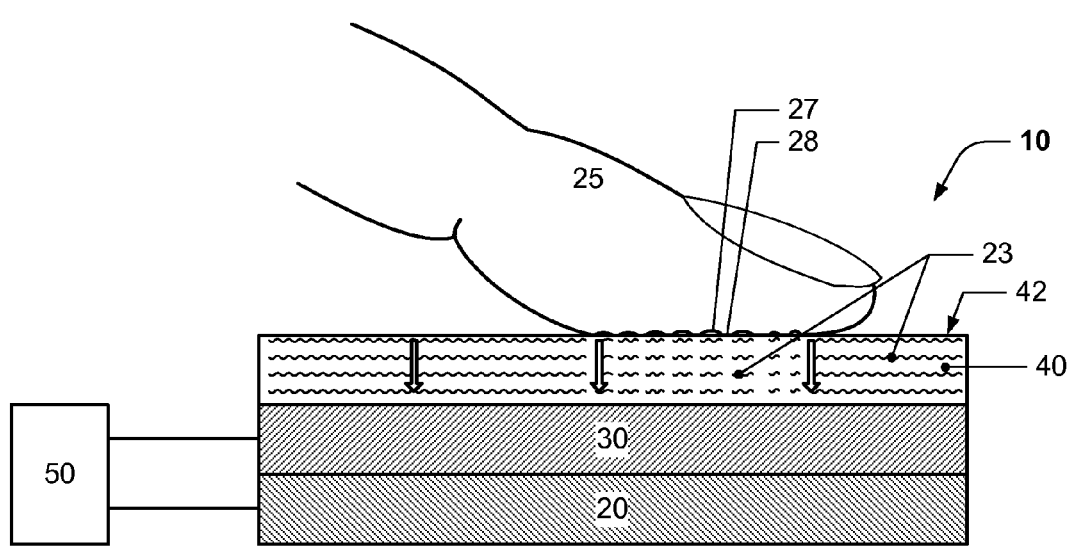

FIGS. 3A-3C provide examples of the process outlined in FIG. 2. As shown in FIG. 3A, touch sensing system 10 includes an ultrasonic transmitter 20 and a force-sensing device 30 under a platen 40. Here, the control system 50 is electrically connected (directly or indirectly) with the ultrasonic transmitter 20 and the force-sensing device 30. In this example, the force-sensing device 30 is capable of functioning as an ultrasonic receiver. Here, the force-sensing device 30 includes a piezoelectric material and an array of sensor pixel circuits disposed on a substrate.

The ultrasonic transmitter 20 may be a piezoelectric transmitter that can generate ultrasonic waves 21 (see FIG. 3B). At the moment depicted in FIG. 3A, however, the ultrasonic transmitter 20 may be switched off or in a low-power "sleep" mode. Upon receiving an indication of a user touch or tap from a force-sensing device 30, the control system 50 may be capable of switching on the ultrasonic transmitter 20.

In the example shown in FIG. 3B, the control system 50 is capable of controlling the ultrasonic transmitter 20 to generate ultrasonic waves. For example, the control system 50 may supply timing signals that cause the ultrasonic transmitter 20 to generate one or more ultrasonic waves 21. In the example shown in FIG. 3B, ultrasonic waves 21 are shown traveling through the force-sensing device 30 to the exposed surface 42 of the platen 40. At the exposed surface 42, the ultrasonic energy corresponding with the ultrasonic waves 21 may either be absorbed or scattered by an object 25 that is in contact with the platen 40, such as the skin of a fingerprint ridge 28, or reflected back.

As shown in FIG. 3C, in those locations where air contacts the exposed surface 42 of the platen 40, e.g., the valleys 27 between the fingerprint ridges 28, most energy of the ultrasonic waves 21 will be reflected back toward the force-sensing device 30 for detection. The control system 50 may then receive signals from the force-sensing device 30 that are indicative of reflected ultrasonic energy 23. The control system 50 may use output signals received from the force-sensing device 30 to determine a location of the object 25 and/or construct a digital image of the object 25. In some implementations, the control system 50 may be configured to process output signals corresponding to multiple objects 25 simultaneously. According to some implementations, the control system 50 may also, over time, successively sample the output signals to detect movement of one or more objects 25.

Figure 4A:
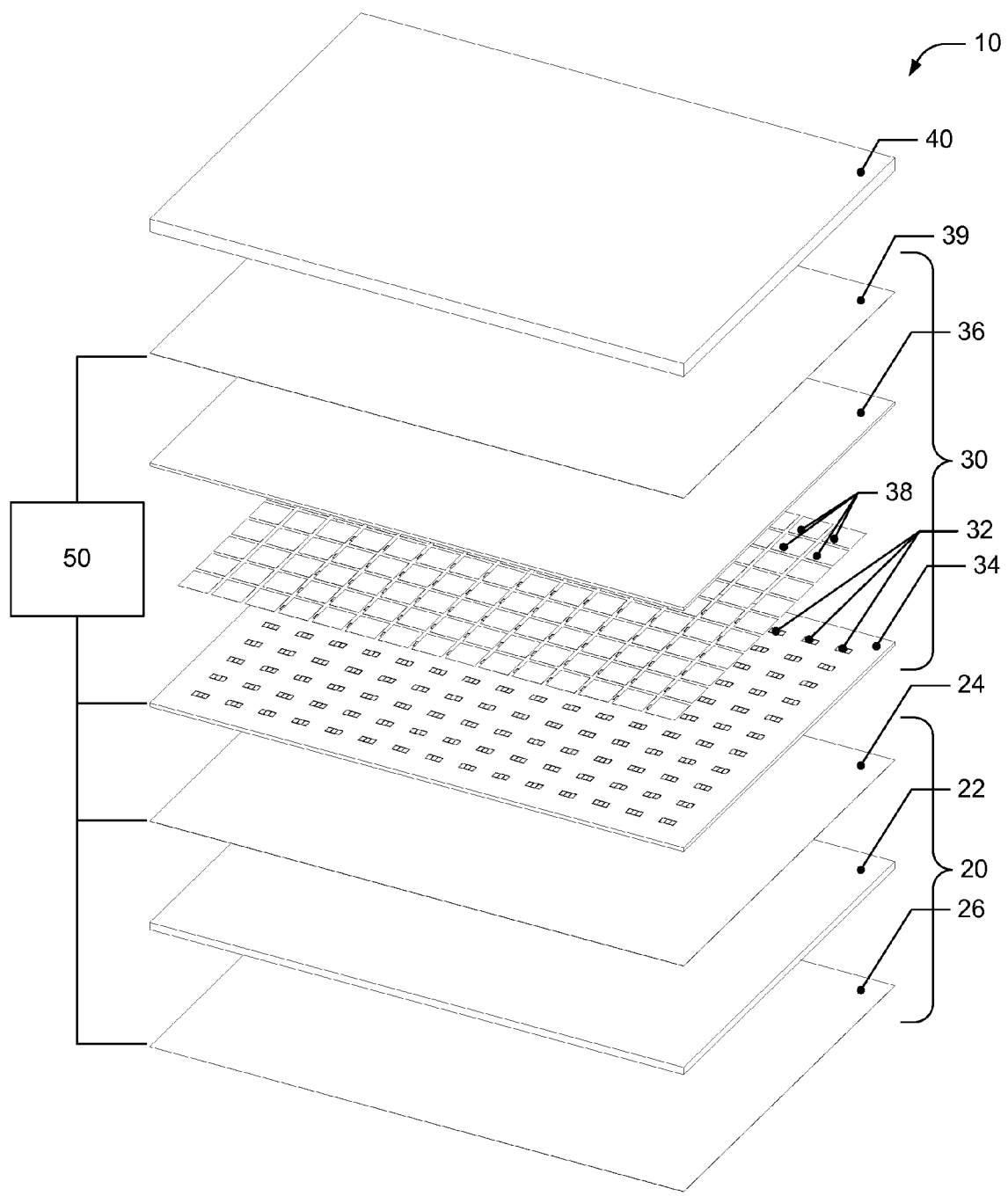
FIG. 4A shows an example of an exploded view of a touch sensing system.

FIG. 4A shows an example of an exploded view of a touch sensing system. In this example, the touch sensing system 10 includes an ultrasonic transmitter 20 and a force-sensing device 30 under a platen 40. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. in this example, the control system 50 may be capable of causing a voltage may be applied to the piezoelectric transmitter layer 22 via a first transmitter electrode 24 and a second transmitter electrode 26. In this fashion, an ultrasonic wave may be made by changing the thickness of the layer. This ultrasonic wave may travel towards a finger (or other object to be detected), passing through the platen 40. A portion of the wave not absorbed by the object to be detected may be reflected so as to pass back through the platen 40 and be received by the force-sensing device 30. The first and second transmitter electrodes 24 and 26 may be metallized electrodes, for example, metal layers that coat opposing sides of the piezoelectric transmitter layer 22.

The force-sensing device 30 may include an array of sensor pixel circuits 32 disposed on a substrate 34, which also may be referred to as a backplane, and a piezoelectric film layer 36. In some implementations, each sensor pixel circuit 32 may include one or more TFT elements and, in some implementations, one or more additional circuit elements such as diodes, capacitors, and the like. Each sensor pixel circuit 32 may be configured to convert an electric charge generated in the piezoelectric film layer 36 proximate to the pixel circuit into an electrical signal. Each sensor pixel circuit 32 may include a pixel input electrode 38 that electrically couples the piezoelectric film layer 36 to the sensor pixel circuit 32.

In the illustrated implementation, a receiver bias electrode 39 is disposed on a side of the piezoelectric film layer 36 proximal to platen 40. The receiver bias electrode 39 may be a metallized electrode and may be grounded or biased to control which signals are passed to the array of sensor pixel circuits 32. Ultrasonic energy that is reflected from the exposed (top) surface 42 of the platen 40 may be converted into localized electrical charges by the piezoelectric film layer 36. These localized charges may be collected by the pixel input electrodes 38 and passed on to the underlying sensor pixel circuits 32. The charges may be amplified by the sensor pixel circuits 32 and then provided to the control system 50. Simplified examples of sensor pixel circuits 32 are shown in FIGS. 1B, 1C and 5. However, one of ordinary skill in the art will appreciate that many variations of and modifications to the example sensor pixel circuits 32 may be contemplated.

The control system 50 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 50 may operate substantially as described above. For example, the control system 50 may be capable of processing the amplified signals received from the sensor pixel circuits 32.

The control system 50 may be capable of controlling the ultrasonic transmitter 20 and/or the force-sensing device 30 to obtain fingerprint image data, e.g., by obtaining fingerprint images. Whether or not the touch sensing system 10 includes an ultrasonic transmitter 20, the control system 50 may be capable of controlling access to one or more devices based, at least in part, on the fingerprint image data. The touch sensing system 10 (or an associated device) may include a memory system that includes one or more memory devices. In some implementations, the control system 50 may include at least a portion of the memory system. The control system 50 may be capable of capturing a fingerprint image and storing fingerprint image data in the memory system. In some implementations, the control system 50 may be capable of capturing a fingerprint image and storing fingerprint image data in the memory system even while maintaining the ultrasonic transmitter 20 in an "off" state.

In some implementations, the control system 50 may be capable of operating the touch sensing system in an ultrasonic imaging mode or a force-sensing mode. In some implementations, the control system may be capable of maintaining the ultrasonic transmitter 20 in an "off" state when operating the touch sensing system in a force-sensing mode. The force-sensing device 30 may be capable of functioning as an ultrasonic receiver when the touch sensing system 10 is operating in the ultrasonic imaging mode.

In some implementations, the control system 50 may be capable of controlling other devices, such as a display system, a communication system, etc. In some implementations, for example, the control system 50 may be capable of powering on one or more components of a device such as the display device 740, which is described below with reference to FIGS. 7A and 7B. Accordingly, in some implementations the control system 50 also may include one or more components similar to the processor 21, the array driver 22 and/or the driver controller 29 shown in FIG. 7B. In some implementations, the control system 50 may be capable of detecting a touch or tap received via the force-sensing device 30 and activating at least one feature of the mobile display device in response to the touch or tap. The "feature" may be a component, a software application, etc.

The platen 40 can be any appropriate material that can be acoustically coupled to the receiver, with examples including plastic, ceramic and glass. In some implementations, the platen 40 can be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the force-sensing device 30 is capable of imaging fingerprints in a force detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric film layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric film layer 36 may be selected so as to be suitable for generating and receiving ultrasonic waves. In one example, a PVDF piezoelectric transmitter layer 22 is approximately 28 µm thick and a PVDF-TrFE receiver layer 36 is approximately 12 µm thick. Example frequencies of the ultrasonic waves are in the range of 5 MHz to 30 MHz, with wavelengths on the order of a quarter of a millimeter or less.

Figure 4B:
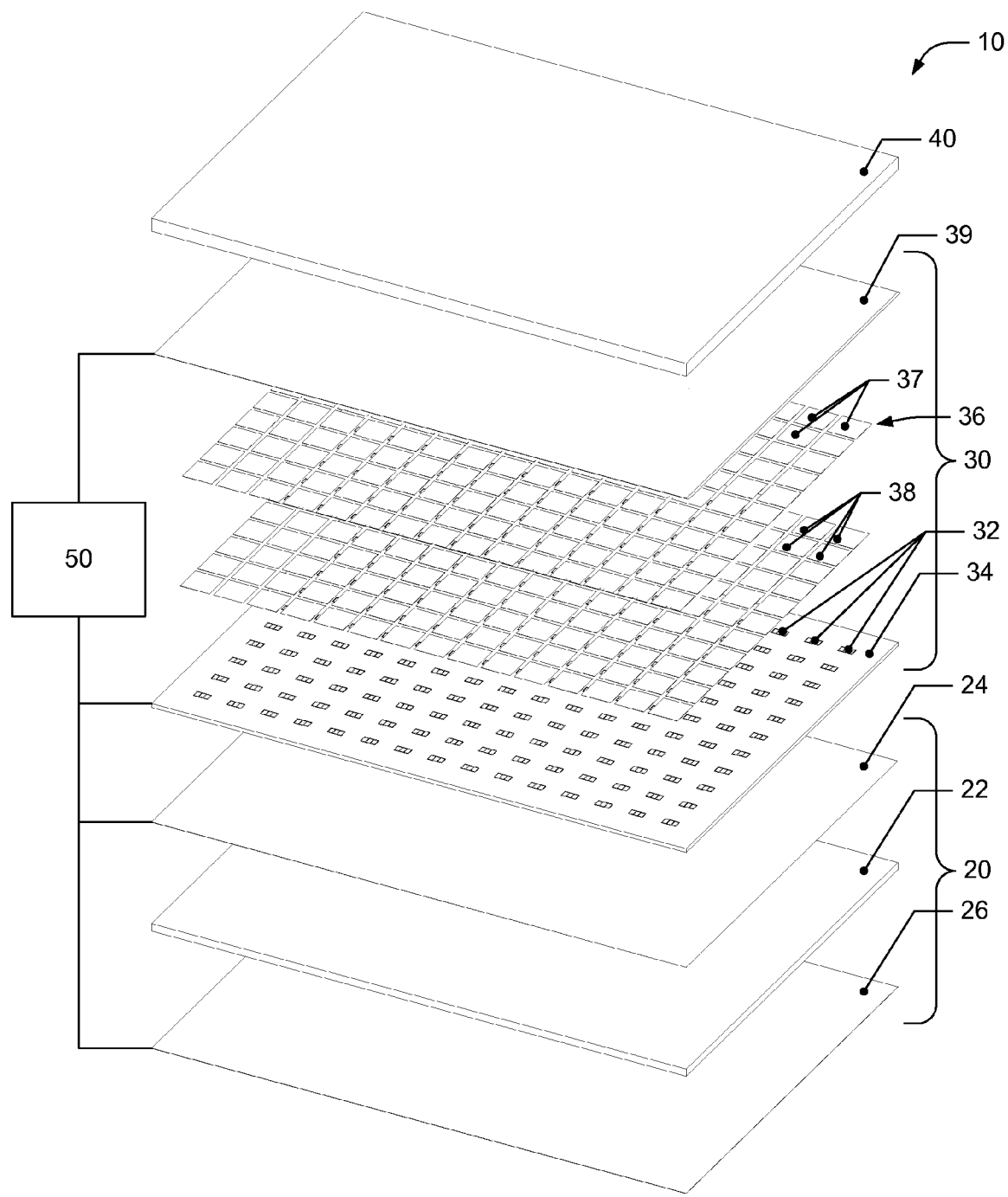
FIG. 4B shows an exploded view of an alternative example of a touch sensing system.

FIG. 4B shows an exploded view of an alternative example of a touch sensing system. In this example, the piezoelectric film layer 36 has been formed into discrete elements 37. In the implementation shown in FIG. 4B, each of the discrete elements 37 corresponds with a single pixel input electrode 38 and a single sensor pixel circuit 32. However, in alternative implementations of the touch sensing system 10, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 3A through 4B show example arrangements of ultrasonic transmitters and receivers in a touch sensing system, with other arrangements possible. For example, in some implementations, the ultrasonic transmitter 20 may be above the force-sensing device 30 and therefore closer to the object(s) 25 to be detected. In some implementations, the touch sensing system 10 may include an acoustic delay layer. For example, an acoustic delay layer can be incorporated into the touch sensing system 10 between the ultrasonic transmitter 20 and the force-sensing device 30. An acoustic delay layer can be employed to adjust the ultrasonic pulse timing, and at the same time electrically insulate the force-sensing device 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the force-sensing device 30. In doing so, the range of time during which an energy pulse that carries information about the object by virtue of having been reflected by the object may he made to arrive at the force-sensing device 30 during a time range when it is unlikely that energy reflected from other parts of the touch sensing system 10 is arriving at the force-sensing device 30. In some implementations, the substrate 34 and/or the platen 40 may serve as an acoustic delay layer.

FIG. 5 depicts a 4×4 pixel array of sensor pixel circuits for a touch sensing system. Each sensor pixel circuit 32 may, for example, be associated with a discrete element 37 of piezoelectric sensor material, a peak detection circuit 8 (which is a diode in this example) and a readout transistor. Many or all of these elements may be formed on or in a backplane (e.g., the substrate 34 shown in FIGS. 1A-1C) to form the sensor pixel circuits 32. In practice, the discrete element 37 of piezoelectric sensor material of each sensor pixel circuit 32 may transduce received ultrasonic energy into electrical charges. The peak detection circuit 8 may register the maximum amount of charge detected by the discrete element 37 of piezoelectric sensor material. Each row of the sensor pixel circuit array may then be scanned, e.g., through a row select mechanism, a gate driver, or a shift register, and the readout transistor for each column may be triggered to allow the magnitude of the peak charge for each pixel to be read by additional circuitry, e.g., a multiplexer and an A/D converter. The sensor pixel circuits 32 may include one or more TFTs to allow gating, addressing, and resetting of the sensor pixel circuits 32.

Each sensor pixel circuit 32 may provide information about a small portion of the object detected by the touch sensing system 10. While, for convenience of illustration, the example shown in FIG. 5 is of a relatively coarse resolution, touch sensing systems having a resolution on the order of 500 pixels per inch or higher that are configured with a layered structure, substantially similar to that shown in FIGS. 4A and 4B, have been demonstrated by the present inventors. The detection area of the touch sensing system 10 may be selected depending on the intended object of detection. For example, the detection area may range from 5 mm×5 mm for a single finger to 3 inches×3 inches for four fingers. Smaller and larger areas may be used as appropriate for the object(s) to be detected and/or imaged.

FIG. 6 shows an example of a high-level block diagram of a touch sensing system. Many of the elements shown may form part of the control system 50. A sensor controller may include a control unit that is configured to control various aspects of the sensor system, e.g., ultrasonic transmitter timing and excitation waveforms, bias voltages for the ultrasonic receiver and sensor pixel circuitry, sensor pixel addressing, signal filtering and conversion, readout frame rates, and so forth. The sensor controller may also include a data processor that receives data from the sensor pixel circuit array. The data processor may translate the digitized data into image data of a fingerprint or format the data for further processing.

For example, the control unit may send a transmitter (Tx) excitation signal to a Tx driver at regular intervals to cause the Tx driver to excite the ultrasonic transmitter and produce planar ultrasonic waves. The control unit may send level select input signals through a receiver (Rx) bias driver to bias the receiver bias electrode and allow gating of acoustic signal detection by the pixel circuitry. A demultiplexer may be used to turn on and off gate drivers that cause a particular row or column of sensor pixel circuits to provide output signals. Output signals from the pixels may be sent through a charge amplifier, a filter such as an RC filter or an anti-aliasing filter, and a digitizer to the data processor. Note that portions of the system may be included on the TFT backplane and other portions may be included in an associated integrated circuit.

Figure 7A:
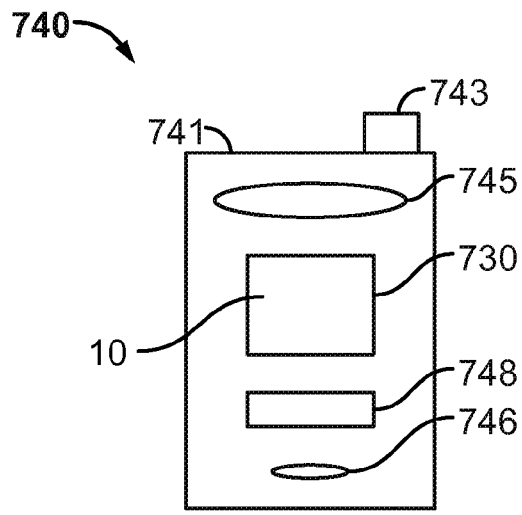
FIGS. 7A and 7B show examples of system block diagrams illustrating a display device that includes a touch sensing system as described herein.
Figure 7B:
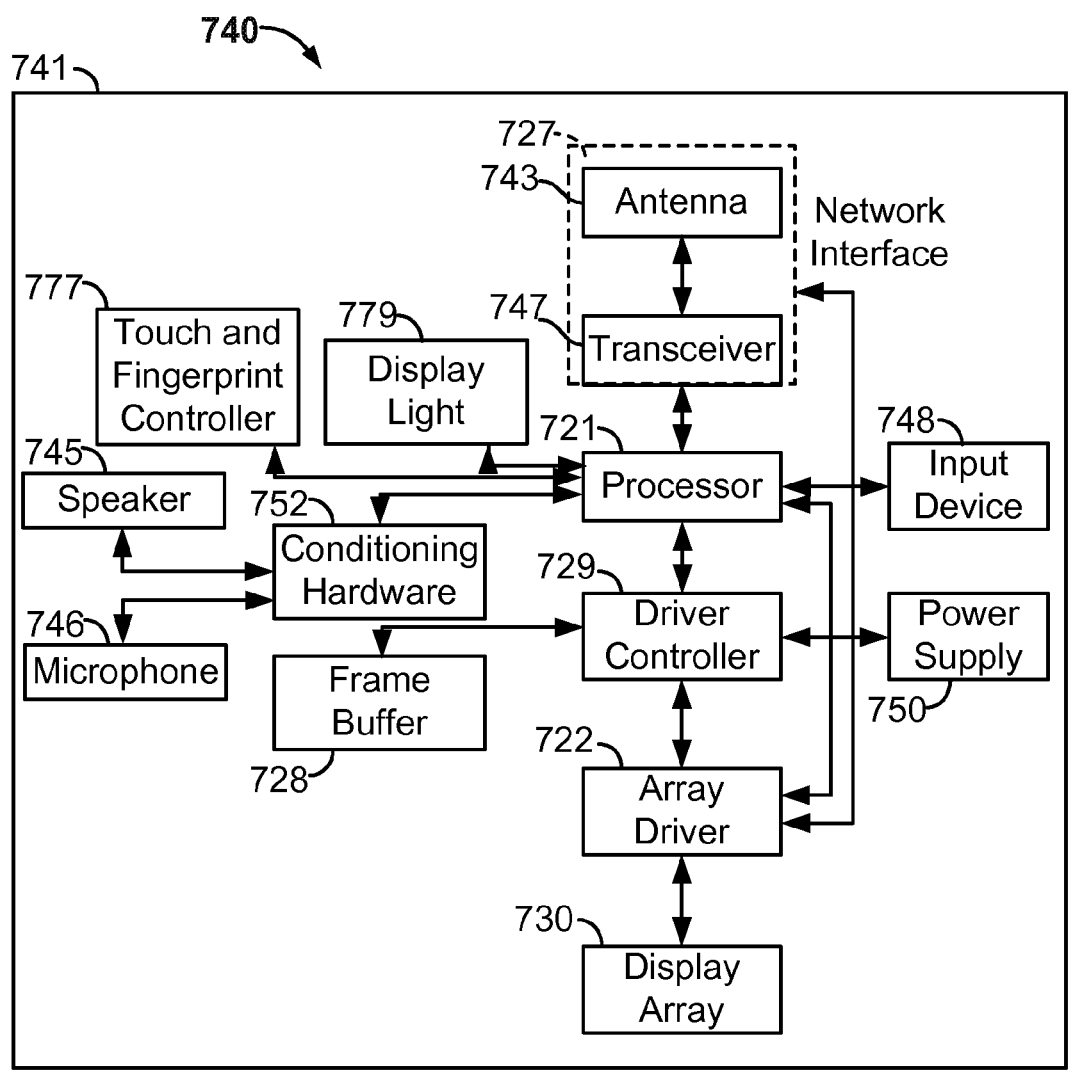

FIGS. 7A and 7B show examples of system block diagrams illustrating a display device that includes a touch sensing system as described herein. The display device 740 may be, for example, mobile display device such as a smart phone, a cellular or mobile telephone, etc. However, the same components of the display device 740 or slight variations thereof are also illustrative of various types of display devices such as televisions, computers, tablets, e-readers, hand-held devices and portable media devices.

In this example, the display device 740 includes a housing 741, a display 730, a touch sensing system 10, an antenna 743, a speaker 745, an input device 748 and a microphone 746. The housing 741 may be formed from any of a variety of manufacturing processes, including injection molding, and vacuum forming. In addition, the housing 741 may be made from any of a variety of materials, including, but not limited to: plastic, metal, glass, rubber and ceramic, or a combination thereof. The housing 741 may include removable portions (not shown) that may be interchanged with other removable portions of different color, or containing different logos, pictures, or symbols.

The display 730 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display 30 may include an interferometric modulator (IMOD)-based display.

The components of one example of the display device 740 are schematically illustrated in FIG. 7B. Here, the display device 740 includes a housing 741 and may include additional components at least partially enclosed therein. For example, the display device 740 includes a network interface 727 that includes an antenna 743 which may be coupled to a transceiver 747. The network interface 727 may be a source for image data that could be displayed on the display device 740. Accordingly, the network interface 727 is one example of an image source module, but the processor 721 and the input device 748 also may serve as an image source module. The transceiver 747 is connected to a processor 721, which is connected to conditioning hardware 752. The conditioning hardware 752 may be capable of conditioning a signal (such as applying a filter or otherwise manipulating a signal). The conditioning hardware 752 may be connected to a speaker 745 and a microphone 746. The processor 721 also may be connected to an input device 748 and a driver controller 729. The driver controller 729 may be coupled to a frame buffer 728, and to an array driver 722, which in turn may be coupled to a display array 730. One or more elements in the display device 740, including elements not specifically depicted in FIG. 7B, may be capable of functioning as a memory device and be capable of communicating with the processor 721 or other components of a control system. In some implementations, a power supply 750 may provide power to substantially all components in the particular display device 740 design.

In this example, the display device 740 also includes a touch and fingerprint controller 777. The touch and fingerprint controller 777 may, for example, be a part of a control system 50 such as that described above. Accordingly, in some implementations the touch and fingerprint controller 777 (and/or other components of the control system 50) may include one or more memory devices. In some implementations, the control system 50 also may include components such as the processor 721, the array driver 722 and/or the driver controller 729 shown in FIG. 7B. The touch and fingerprint controller 777 may be capable of communicating with the touch sensing system 10, e.g., via routing wires, and may be capable of controlling the touch sensing system 10. The touch and fingerprint controller 777 may be capable of determining a location and/or movement of one or more objects, such as fingers, on or proximate the touch sensing system 10. In alternative implementations, however, the processor 721 (or another part of the control system 50) may be capable of providing some or all of this functionality.

The touch and fingerprint controller 777 (and/or another element of the control system 50) may be capable of providing input for controlling the display device 740 according to one or more touch locations. In some implementations, the touch and fingerprint controller 777 may be capable of determining movements of one or more touch locations and of providing input for controlling the display device 740 according to the movements. Alternatively, or additionally, the touch and fingerprint controller 777 may be capable of determining locations and/or movements of objects that are proximate the display device 740. Accordingly, the touch and fingerprint controller 777 may be capable of detecting finger or stylus movements, hand gestures, etc., even if no contact is made with the display device 40. The touch and fingerprint controller 777 may be capable of providing input for controlling the display device 40 according to such detected movements and/or gestures.

As described elsewhere herein, the touch and fingerprint controller 777 (or another element of the control system 50) may be capable of providing one or more fingerprint detection operational modes. Accordingly, in some implementations the touch and fingerprint controller 777 (or another element of the control system 50) may be capable of producing fingerprint images.

In some implementations, the touch sensing system 10 may include a force-sensing device 30 and/or an ultrasonic transmitter 20 such as described elsewhere herein. According to some such implementations, the touch and fingerprint controller 777 (or another element of the control system 50) may be capable of receiving input from the force-sensing device 30 and powering on or "waking up" the ultrasonic transmitter 20 and/or another component of the display device 740.

The network interface 727 includes the antenna 743 and the transceiver 747 so that the display device 740 may communicate with one or more devices over a network. The network interface 727 also may have some processing capabilities to relieve, for example, data processing requirements of the processor 721. The antenna 743 may transmit and receive signals. In some implementations, the antenna 43 transmits and receives RF signals according to the IEEE 16.11 standard, including IEEE 16.11(a), (b), or (g), or the IEEE 802.11 standard, including IEEE 802.11 a, b, g, n, and further implementations thereof. In some other implementations, the antenna 43 transmits and receives RF signals according to the Bluetooth® standard. In the case of a cellular telephone, the antenna 743 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 747 may pre-process the signals received from the antenna 43 so that they may be received by and further manipulated by the processor 721. The transceiver 747 also may process signals received from the processor 721 so that they may be transmitted from the display device 740 via the antenna 743.

In some implementations, the transceiver 747 may be replaced by a receiver. In addition, in some implementations, the network interface 727 may be replaced by an image source, which may store or generate image data to be sent to the processor 721. The processor 721 may control the overall operation of the display device 740. The processor 721 receives data, such as compressed image data from the network interface 727 or an image source, and processes the data into raw image data or into a format that may be readily processed into raw image data. The processor 721 may send the processed data to the driver controller 729 or to the frame buffer 728 for storage. Raw data typically refers to the information that identifies the image characteristics at each location within an image. For example, such image characteristics may include color, saturation and gray-scale level.

The processor 721 may include a microcontroller, CPU, or logic unit to control operation of the display device 740. The conditioning hardware 752 may include amplifiers and filters for transmitting signals to the speaker 745, and for receiving signals from the microphone 46. The conditioning hardware 752 may be discrete components within the display device 40, or may be incorporated within the processor 721 or other components.

The driver controller 729 may take the raw image data generated by the processor 721 either directly from the processor 721 or from the frame buffer 728 and may re-format the raw image data appropriately for high speed transmission to the array driver 722. In some implementations, the driver controller 729 may re-format the raw image data into a data flow having a raster-like format, such that it has a time order suitable for scanning across the display array 730. Then the driver controller 729 sends the formatted information to the array driver 722. Although a driver controller 729, such as an LCD controller, is often associated with the system processor 721 as a stand-alone Integrated Circuit (IC), such controllers may be implemented in many ways. For example, controllers may be embedded in the processor 721 as hardware, embedded in the processor 721 as software, or fully integrated in hardware with the array driver 722.

The array driver 722 may receive the formatted information from the driver controller 729 and may re-format the video data into a parallel set of waveforms that are applied many times per second to the hundreds, and sometimes thousands (or more), of leads coming from the display's x-y matrix of display elements.

In some implementations, the driver controller 729, the array driver 722, and the display array 730 are appropriate for any of the types of displays described herein. For example, the driver controller 729 may be a conventional display controller or a bi-stable display controller (such as an IMOD display element controller). Additionally, the array driver 722 may be a conventional driver or a bi-stable display driver. Moreover, the display array 730 may be a conventional display array or a bi-stable display. In some implementations, the driver controller 729 may be integrated with the array driver 722. Such an implementation may be useful in highly integrated systems, for example, mobile phones, portable-electronic devices, watches or small-area displays.

In some implementations, the input device 748 may be capable of allowing, for example, a user to control the operation of the display device 740. The input device 748 may include a keypad, such as a QWERTY keyboard or a telephone keypad, a button, a switch, a rocker, a touch-sensitive screen, a touch-sensitive screen integrated with the display array 730, or a pressure- or heat-sensitive membrane. The microphone 746 may be capable of functioning as an input device for the display device 740. In some implementations, voice commands through the microphone 746 may be used for controlling operations of the display device 40.

The power supply 750 may include a variety of energy storage devices. For example, the power supply 750 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 750 also may be a renewable energy source, a capacitor, or a solar cell, including a plastic solar cell or solar-cell paint. The power supply 750 also may be capable of receiving power from a wall outlet.

In some implementations, control programmability resides in the driver controller 729 which may be located in several places in the electronic display system. In some other implementations, control programmability resides in the array driver 722. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus. above-described optimization If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A touch sensing system including a force-sensing device, the force-sensing device comprising:
   a substrate;
   an array of sensor pixel circuits disposed on the substrate;
   discrete elements of a piezoelectric film layer, each discrete element corresponding with an individual sensor pixel circuit;
   a plurality of pixel input electrodes, each pixel input electrode configured for making an electrical connection between a first side of a discrete element of the piezoelectric layer and one of the sensor pixel circuits;
a receiver bias electrode configured for making an electrical connection with a second side of discrete elements of the piezoelectric layer; and
a control system capable of:
receiving a signal from one or more of the sensor pixel circuits, the signal corresponding to a force applied to one or more discrete elements of the piezoelectric film layer; and
determining a location of an object exerting the force.

2. The touch sensing system of claim 1, wherein each sensor pixel circuit further comprises:
a charge amplifier capable of amplifying charges received from the pixel input electrode.

3. The touch sensing system of claim 1, wherein each sensor pixel circuit further comprises:
a peak detection circuit capable of registering a maximum amount of charge produced by the applied force.

4. The touch sensing system of claim 3, wherein each sensor pixel circuit further comprises:
a reset device capable of removing accumulated charge from the peak detection circuit.

5. The touch sensing system of claim 1, wherein the force-sensing device has a sufficiently high resolution to function as a fingerprint sensor.

6. The touch sensing system of claim 1, further comprising:
an ultrasonic transmitter, wherein the control system is capable of operating the touch sensing system in an ultrasonic imaging mode or a force-sensing mode.

7. The touch sensing system of claim 6, wherein the control system is capable of maintaining the ultrasonic transmitter in an "off" state when operating the touch sensing system in a force-sensing mode.

8. The touch sensing system of claim 7, further including a memory system, wherein the control system is capable of capturing a fingerprint image and storing fingerprint image data in the memory system while maintaining the ultrasonic transmitter in the "off" state.

9. The touch sensing system of claim 8, wherein the control system is capable of controlling access to one or more devices based, at least in part, on the fingerprint image data.

10. The touch sensing system of claim 6, wherein the force-sensing device is capable of functioning as an ultrasonic receiver when the touch sensing system is operating in the ultrasonic imaging mode.

11. The touch sensing system of claim 6, wherein the control system is capable of detecting a touch or tap received via the force-sensing device and switching on the ultrasonic transmitter in response to the touch or tap.

12. The touch sensing system of claim 1, wherein the substrate is a thin film transistor (TFT) substrate and wherein the sensor pixel circuits include TFT sensor pixel circuits.

13. A mobile display device that includes the touch sensing system of claim 1.

14. The mobile display device of claim 13, wherein the control system is capable of detecting a touch or tap received via the force-sensing device and activating at least one feature of the mobile display device in response to the touch or tap.

15. The mobile display device of claim 14, wherein the control system is capable of:
operating the mobile display device in a sleep mode during periods of inactivity;
detecting a touch or tap received via the force-sensing device; and
waking the mobile display device from the sleep mode in response to the touch or tap.

16. A touch sensing system, comprising:
an ultrasonic receiver including a piezoelectric film layer and an array of sensor pixel circuits;
an ultrasonic transmitter; and
a control system capable of:
receiving, while the ultrasonic transmitter is switched off, a signal from one or more of the sensor pixel circuits of the ultrasonic receiver, the signal corresponding to a force applied to the piezoelectric film layer; and
switching on the ultrasonic transmitter in response to the signal.

17. The touch sensing system of claim 16, wherein the control system is capable of determining a position or a motion of one or more objects corresponding to a plurality of signals received by the control system.

18. A mobile display device including the touch sensing system of claim 16, wherein the control system is capable of:
operating the mobile display device in a sleep mode during periods of inactivity; and
waking the mobile display device from the sleep mode in response to the signal.

* * * * *